US006557134B2

(12) United States Patent
Bims et al.

(10) Patent No.: US 6,557,134 B2
(45) Date of Patent: *Apr. 29, 2003

(54) ARQ METHOD FOR WIRELESS COMMUNICATION

(75) Inventors: Harry Bims, Palo Alto, CA (US); Avinash Ghirnikar, San Jose, CA (US); Biswa Ghosh, Mountain View, CA (US)

(73) Assignee: Glenayre Electronics, Inc., Duluth, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,776

(22) Filed: Sep. 30, 1997

(65) Prior Publication Data

US 2002/0019965 A1 Feb. 14, 2002

(51) Int. Cl.$^7$ ............................. G08C 25/02; H04L 1/18
(52) U.S. Cl. ........................ 714/748; 370/335; 375/365
(58) Field of Search ................................. 714/746–749, 714/704, 812, 706; 340/3.44, 539, 825, 5, 7.43, 7.27; 370/463, 244, 505, 252, 509, 216, 276, 337, 313, 311; 375/365, 363; 709/236, 250; 463/44, 36, 43; 455/435

(56) References Cited

U.S. PATENT DOCUMENTS

| | | | | |
|---|---|---|---|---|
| 4,161,719 A | * | 7/1979 | Parikh et al. ................ | 375/365 |
| 4,905,234 A | * | 2/1990 | Childress et al. ............ | 714/749 |
| 5,444,438 A | * | 8/1995 | Goldberg ................ | 340/825.44 |
| 5,588,009 A | * | 12/1996 | Will ........................... | 714/749 |
| 5,651,132 A | * | 7/1997 | Honda et al. ................ | 714/6 |
| 6,144,653 A | * | 11/2000 | Persson et al. ............. | 370/337 |
| 6,175,557 B1 | * | 1/2001 | Diachina et al. ............ | 370/313 |
| 6,327,256 B1 | * | 12/2001 | Paivike et al. ............. | 370/337 |

OTHER PUBLICATIONS

Fullmer, C.L. et al. (Adding adaptive flow control to Swift/RAID: IEEE, Mar. 31, 1995).*
Argenti, F et al. (An ARQ protocol for mobile radio systems, IEEE, Jun. 18, 1992).*
Applied Data Communications, James E. Goldman, pp. 74–75, 1995.*
Data Communications, a User's Guide, Kenneth Sherman, pp. 106, 107, 108, and 173, 1981.*
Throughput Analysis of ARQ Selective-Repeat Protocol with Time Diversity in Markov Channels, Zorzi, et al., IEEE, 1995.*
Throughput Performances of SR ARQ with Modulo Operation Using Data Field in Mobile Environment, Matsuki, et al., IEEE, 1996.*
How to implement GBN-ARQ the hard way: DECT, Berger, et al., IEEE, 1997.*
Circuit Based Data Transport for a Wireless Access Communications System, Chang, et al., IEEE, 1993.*
Throughput Analysis of Go-Back-N ARQ in Markov Channels with Unreliable Feedback, Zorzi, et al., IEEE, 1995.*

* cited by examiner

Primary Examiner—Albert Decady
Assistant Examiner—Guy J. Lamarre
(74) Attorney, Agent, or Firm—Christensen O'Connor Johnson Kindness PLLC (57) ABSTRACT

Forward and Reverse Channel Automatic Repeat reQuest (ARQ) communication is described in which a Forward Channel Automatic Repeat reQuest (ARQ) session between a first unit and a second unit is performed, in which a command is send to the second unit to start a forward channel ARQ session, where the command includes a message length field specifying the length of an ARQ message to be sent by the first unit to the second unit. The second unit may refuse the command because of the length of the ARQ message.

31 Claims, 4 Drawing Sheets

ARQ METHOD FOR WIRELESS COMMUNICATION

FIELD OF THE INVENTION

The present invention relates to the field of data communications; more particularly, the present invention relates to performing automatic repeat request (ARQ) sessions in a communication system.

BACKGROUND OF THE INVENTION

A communication system transfers information between a source and a destination. Generally, a communication system includes a transmitter and a receiver which transmit and receive information signals over some media. This media may be cable wiring or atmosphere. When communications occur over atmosphere, or airwaves, they are commonly referred to as "wireless" communications. Examples of wireless communication systems include digital cellular, packet data, paging and digital cordless telephones, wireless modems, wireless local and wide area networks, digital satellite communications and personal communications networks.

Paging communication systems have typically been one-way communication systems. Recently, two-way paging systems have been introduced and are now commercially available.

One problem faced with current wireless communications systems is ensuring that the entire message is received by the mobile unit without errors. Some communication systems perform ARQ, or Automatic Repeat reQuest, as a way of providing reliable transmission of information over a lossy channel. In all ARQ schemes, the sender and recipient communicate with each other so that when some data arrives at the recipient having been corrupted or is lost, the sender retransmits that information until either the entire message is received reliably by the recipient or the message transfer is aborted.

ARQ has been used in wired communications systems in the prior art. More recently, ARQ has been used in GSM and cellular. For example, see the TIA/EIA interim standard, TIA/EIA/IS-136.2-A, October 1996 for cellular communication. However, the IS-136 implements symmetric forward and reverse channels and each unit is autonomously responsible for its own timing and actions.

Two-way paging channels have the characteristic of non-real time operation, limited reverse channel bandwidth (when compared to the forward channel), and the network device, or terminal, controls the allocation of the bandwidth.

When an ARQ session is started, there is no guarantee that the receiving unit will receive the entire message. The receiving unit may end up with a message with errors. This situation leads to another problem in that even if the receiving unit won't be able to receive the entire message without errors, the receiving unit is still consuming valuable battery power in the process. It would be desirable to ensure that messages, once started, are received without errors and that no extraneous power consumption due to extraneous transmissions occurs.

In Forward Channel ARQ, because the ARQ message is sent in separately transmitted fragments, the device receiving the ARQ message may not be able to receive the entire message. This is because the receiving unit cannot determine whether it has enough memory to receive the entire ARQ message before some portion of the message is already received. Also the receiving unit cannot refuse an ARQ message.

In the Reverse Channel ARQ, once the system knows that a mobile unit wants to send a message, the transmissions are scheduled and an acknowledgment is sent by the network unit after receiving each fragment. Thus, the network unit knows when the message has been sent completely. If the network unit does not receive a scheduled transmission, it sends a message requesting the mobile unit to resend the last transmission. The mobile unit responds by transmitting the last fragment (that it understood was to be sent).

One problem associated with Reverse Channel ARQ is that after the network unit has indicated that the entire message has been received (because it knows when the entire message has been received), it sends the acknowledgment to the mobile unit. However, if the mobile unit does not receive this acknowledgment from the network unit, it will continue sending the final fragment. However, the network unit, operating as it had already received the entire message, is no longer looking for the last fragment from the mobile unit and, as far as it is concerned, believes that the ARQ session has ended. Therefore, the mobile unit will continue to send the last fragment, thereby consuming extra energy in continuing to transmit and continuing to wait for the network unit's acknowledgment, even though the message has been completed or has been completely received by the network unit. It would be desirable to avoid this extra power consumption and ensure that both units know that the ARQ session has been completed successfully.

The present invention provides for performing ARQ in a manner that avoids the problems and limitations described above in the prior art.

SUMMARY OF THE INVENTION

Forward and Reverse Channel Automatic Repeat reQuest (ARQ) communication methods and systems are described. The present invention provides a system having a mobile unit and a network terminal for two way communication with the mobile unit using forward and reverse channels with the network terminal controlling the timing and bandwidth allocation for the reverse channel.

This invention also provides a selective call receiver comprising a storage space and control operable to refuse to receive a message when available space in the storage space is not large enough to store the message.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for performing Automatic Repeat reQuest (ATQ) transfers are described. In the following description, numerous details are set forth, such as message types and names, bit designations, protocols, etc. It will be apparent, however, to one skilled in the art, that the present invention may be practiced without these specific details. In other instances, well-known structures and devices are shown in block diagram form, rather than in detail, in order to avoid obscuring the present invention.

Overview of the Present Invention

The present invention provides for Forward Channel ARQ and Reverse Channel ARQ. Forward Channel ARQ refers to the method of transmitting ARQ messages from the network terminal to the mobile unit, and Reverse Channel ARQ refers to the method of transmitting an ARQ message from the mobile unit to the network terminal.

In one embodiment, ARQ messages are messages of variable length that are sent from the source to the destination either as a single fragment, or as multiple fragments, which are reassembled at the destination to form the entire message. In one embodiment, fragments are fixed size. An ARQ session, or simply, session, refers to the series of transmissions or communications that occur between a network terminal and a mobile unit in completing the transmission of an ARQ message.

The present invention provides a system having a mobile unit and a network terminal for two way communication with the mobile unit using forward and reverse channels with the network terminal being in control of the timing and bandwidth allocation for both channels. In one embodiment, the mobile unit is the selective call transceiver (e.g., a pager receiver, paging transceiver). The network terminal specifies to the mobile unit at least one period of time that the mobile unit may communicate on the forward and reverse channels. In other words, the network channel schedules the communications of the mobile unit on the two channels.

In one embodiment, the mobile unit is a selective call receiver having a storage space. The mobile unit of the present invention may refuse to receive a message when available space in the storage space is not large enough to store the message.

Figure 1:
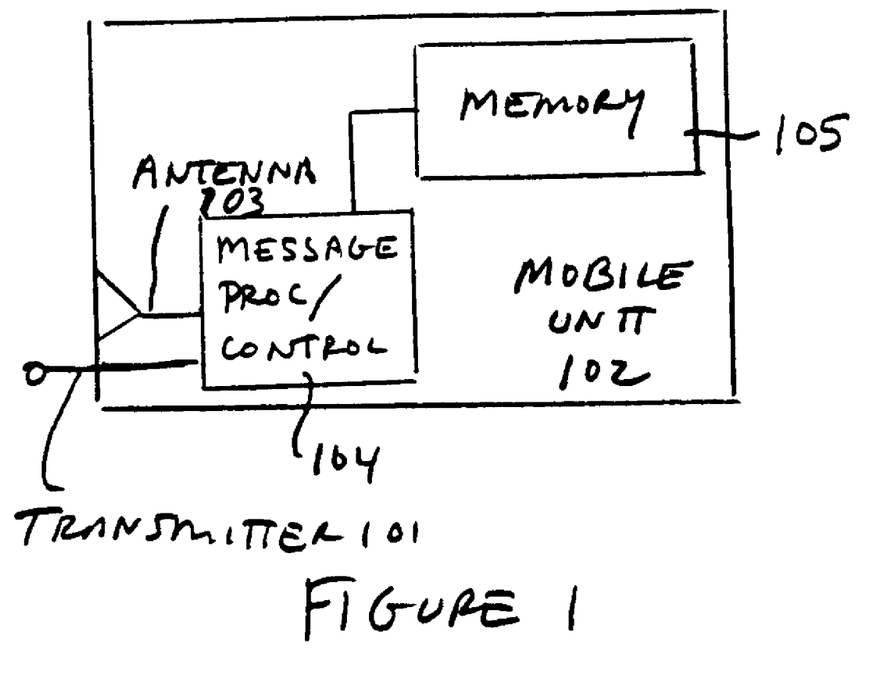
FIG. 1 illustrates one embodiment of a mobile unit of the present invention.

FIG. 1 illustrates one embodiment of the mobile unit of the present invention. Referring to FIG. 1, the mobile unit comprises an antenna 103 to receive messages. Message processing/control 104 processes the messages received. Control 104 is coupled to memory 105 which may be used to store messages, and may include storing messages in a folder. Mobile unit 102 also includes a transmitter 101 coupled to message processing/control 104 to transmit messages under control of the control 104. Control 104 comprises processing logic that may be a combination of hardware (e.g., hardware logic), software or a combination of both. Such message processing, except to the extent set forth herein in conjunction with the description of the present invention, is well known to those skilled in the art. The responses and acknowledgments provided by the mobile unit are made by control 104. Furthermore, control unit 104 is responsible for performing forward and reverse channel ARQ sessions with the terminal unit.

The present invention provides for performing Forward Channel ARQ between a network terminal and a mobile unit, such as mobile unit 102. Commands are sent to mobile unit 102 to start a forward channel ARQ session where the command includes a message length field specifying the length of an ARQ message to be sent by the network terminal to the mobile unit. In one embodiment, the message length field indicates the length of fragments in the ARQ message. Fragments are made up of a variable number of data units. The size of a data unit is fixed for the duration of a session to a single time-based unit. Mobile unit 102 replies to the command based on the length of the ARQ message.

When mobile unit 102 receives the command, control 104 determines the amount of storage space required for the ARQ message based on the data in the message length field. Control 104 compares the amount of storage required to store the ARQ message to its available memory. Then, based on the comparison, control 104 replies, via transmitter 101, to the command sent by the network terminal.

Based on the comparison between the space required for the ARQ message and the memory space available in the mobile unit, the mobile unit may respond by sending an acknowledgment to the network terminal if the mobile unit desires the network terminal to send the ARQed message. The mobile unit may also provide a memory full response where the available storage in the mobile unit is not sufficient to store the ARQ message. In such a case, the mobile unit terminates the ARQ session. The mobile unit may respond to the command of the network terminal by requesting the network terminal to resend the command. The network terminal then is responsible for resending the command within a predetermined time limit; otherwise, the mobile unit unilaterally terminates the ARQ session. To reiterate, each of these responses is made under the control of control 104.

When the ARQ message is being sent by the network terminal, the mobile unit acknowledges each received fragment via the reverse channel. In response to these acknowledgments, the network terminal sends the next fragment within a predetermined time limit. If the next fragment is not sent in the predetermined time limit, the mobile unit unilaterally terminates the ARQ session.

After all of the fragments in the ARQ message have been sent, the mobile unit sends a message to the network terminal that indicates that the message is done. In response, the network terminal sends another message indicating completion (a "done indication message") to the mobile unit to complete the transfer of the ARQ message.

The present invention also provides for performing a Reverse Channel ARQ between a network terminal and a mobile unit. In the present invention, the mobile unit sends a request to the network terminal to request the Reverse Channel ARQ session. Assuming the request had been granted, the mobile unit sends an ARQ message. The network terminal sends a message to the mobile unit indicating that the message is complete after receiving all of the ARQ message. Thereafter, the mobile unit sends an acknowledgment indication to the network terminal in response to that done indication message. If the mobile unit does not receive the done indication message after a predetermined time limit, it terminates the ARQ session. Similarly, if the network terminal does not receive the acknowledgment indication from the mobile unit within a predetermined time limit, the network terminal resends the done indication message. The network terminal also terminates the ARQ session if the acknowledgment indication is not received within a predetermined time limit.

In the following description, the ARQ methods for communication of the present invention are described in terms of a mobile unit and a network terminal, which communicate with each other via messages. The mobile unit may be a one-way or two-way pager, or another device capable of receiving and/or sending wireless communications. The network terminal may be any device, terminal, computer server, system, or other control device for sending and receiving of communication messages, such as, for example, a terminal in a Network Operations Center (NOC) responsible for coordinating paging communications or another similar device. Other examples include the mobile switching center in IS-136.

In the present invention, a forward channel transmission refers to messages sent from the network terminal to the mobile unit, and a reverse channel transmission refers to messages sent from the mobile unit to the network terminal.

The present invention provides for Forward Channel ARQ and Reverse Channel ARQ. Forward Channel ARQ refers to the method of transmitting an ARQ encoded message from the network terminal to the mobile unit, and Reverse Channel ARQ refers to the method of transmitting an ARQ encoded message from the mobile unit to the network terminal.

Forward Channel ARO

Figure 2:
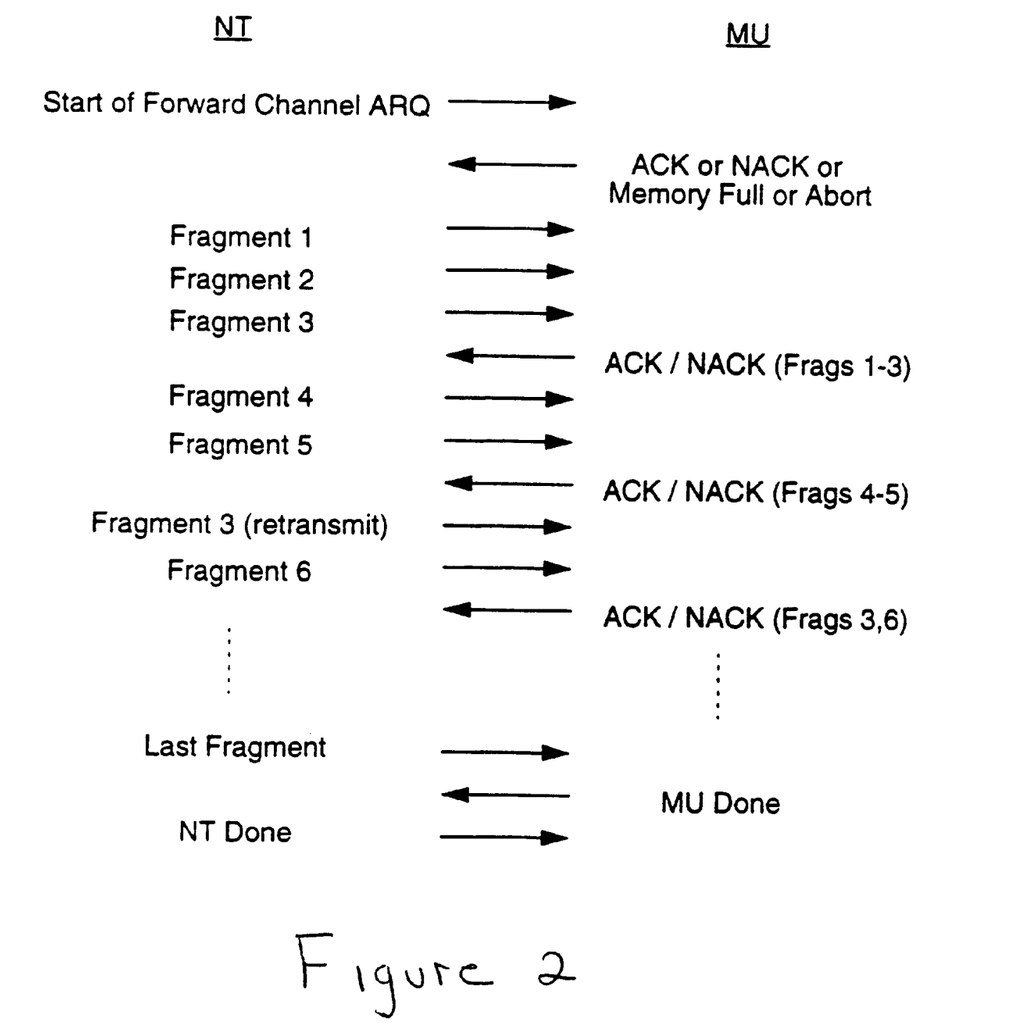
FIG. 2 illustrates a diagram of the messages for a forward channel ARQ session.

FIG. 2 is a diagram of the messages for a forward channel ARQ session. Referring to FIG. 2, a forward channel ARQ session is started when the network terminal sends a "Start of Forward Channel ARQ" command to the mobile unit. In one embodiment, each command is a type of message. The command includes information fields which specify the length of the message, a session number which is used to identify this particular ARQ session, and scheduling information for the MU's reply. The use of a session number allows for multiple ARQ sessions to be simultaneously active between the mobile unit and network terminal, without conflict. The session number is chosen from a set of numbers which are unused in both forward and reverse directions at the time of assignment. Note that the message length does not have to be specified exactly. For example, specification in kilobytes or kilo-characters (for alphanumeric messages) is sufficient.

In one embodiment, the "Start of Forward Channel ARQ" command is defined in a vector with a message type allowing the system to specify response scheduling information while providing command or acknowledgment information to the mobile unit. This command may be used for ARQ acknowledgments with mobile unit transmissions required or requesting status information from the mobile unit while providing scheduling information for the response. In one embodiment, one word of this command contains a 17-bit field which specifies the length of the message in kilobytes or kilo-characters. Specifying the message length allows for ARQ messages up to size 128 Megabytes. In one embodiment, another word of this command contains scheduling information for the mobile unit response, including a start frame number, a start packet field which specifies the packet command from the start of reverse channel, and a total reservation length.

When the mobile unit receives the command for Start of Forward Channel ARQ, control processing, such as control 104, determines how much storage space will be required by the ARQ message from the message length field. The mobile unit then checks if there is sufficient storage space available for this message before replying. Thus, unnecessary transmission of the message is avoided when the mobile unit does not have enough space.

Note that once an ARQ session is started, the mobile unit reserves the storage space for the session. While the ARQ session is occurring, if a new concurrent ARQ session begins, the available memory for the new session is determined by subtracting reserved storage space from the total available space. The available memory is then compared to the message length of the new concurrent ARQ session. In this way, the mobile unit is able to maintain ARQ sessions simultaneously without danger of memory overflow.

In one embodiment, control processing of the mobile unit determines that the available space in its memory will not be enough to receive the ARQ message, and in response to this determination, increases the available space in the memory by deleting one or more previously stored messages (or other information). The control may delete these messages based on priority or based on some other indication provided or stored in the mobile unit. For instance, the mobile unit may delete messages that are already designated for deletion. Such a designation may be by a flag stored for each message indicating that the message is to be deleted. In one embodiment, the oldest messages are deleted to make enough room for the incoming ARQ message. In one embodiment, the messages for deletion are those stored in a specifically designated "delete" folder in the mobile unit in which all messages are designated for deletion.

After determining if sufficient storage space is available, the mobile unit responds with a reverse channel transmission. The transmit timing for the response is determined by the scheduling information provided in the command from the network terminal. The mobile unit response can be one of several choices. The mobile unit may send an Acknowledgment (ACK), which then completes the initial handshake for, start of an ARQ session, a Negative Acknowledgment (NACK), which indicates the command should be resent by the network terminal, a Memory Full response, which indicates the mobile unit does not have sufficient space to store the entire message, or Abort Message, which means that the mobile unit does not wish to receive the message for some other reason. The last two responses result in termination of the ARQ session.

The response from the mobile unit, and in fact all further transmissions between network terminal and mobile unit for the session, will include the session number.

If the network terminal receives an ACK in response to the "Start of Forward Channel ARQ" command, then it sends the message in successive fragments to the mobile unit. The fragments may vary in size and number.

The mobile unit periodically acknowledges reception of the fragments to the network terminal, either as an ACK or a NACK for each fragment. The network terminal schedules the times for the acknowledgments and specifies these times to the mobile unit as part of the fragments. These represent the timing indication by which the receiver responds.

If the network terminal does not correctly receive and decode the response from mobile unit, it will resend the "Start of Forward Channel ARQ" message. In one embodiment, the network terminal has a limit on the number of attempts it will make to send the "Start of Forward Channel ARQ" message without a response from the mobile unit. The network terminal also has a time limit within which this maximum number of retransmissions will occur. When this limit is reached, the network terminal unilaterally aborts the ARQ session.

If the mobile unit detects a "Start of Forward Channel ARQ" message with the same session number as the one it just acknowledged successfully, it again sends an acknowledgment to the most recent message.

If the mobile unit does not correctly receive the "Start of Forward Channel ARQ" message, it transmits a NACK response to the network terminal. In one embodiment, the network terminal has a predetermined time limit within which to transmit a new "Start of Forward Channel ARQ" message. If this does not occur, then the mobile unit unilaterally terminates the ARQ session.

There is a time limit within which the next message fragment is to be transmitted after the ACK has been transmitted for the current fragment. If this time limit is exceeded, the mobile unit unilaterally aborts the ARQ session.

An ACK indicates the fragment was received successfully, and a NACK means the fragment should be retransmitted. If the network terminal receives a NACK from the mobile unit, or neither an ACK nor a NACK, for a fragment or series of fragments, then the network terminal retransmits those fragments. The transmission and retransmission of fragments and acknowledgments continue until the entire message is received by the mobile unit.

If the network terminal does not correctly receive ACK/NACK information from the mobile unit, then it resends the current fragment. There is a predetermined maximum time limit within which this retransmission occurs. In one embodiment, the network terminal has a maximum number of retry attempts without an ACK/NACK before it will unilaterally abort the ARQ session.

When all of the fragments have been correctly received by the mobile unit, the mobile unit sends a "MU Done" message to the network terminal, which signifies that the mobile unit has received all of the fragments. The mobile unit sends this response in place of the usual ACK/NACK response which was scheduled by the network terminal for the last fragment.

In response to the mobile unit Done message, the network terminal then sends a "NT Done" command to mobile unit, thus completing the handshake for the end of the ARQ session. In one embodiment, the "NT Done" command does not require a response from the mobile unit. The ARQ session is then considered to be complete.

If the network terminal misses the MU Done message, then it will retransmit the last fragment or set of fragments. After receiving the fragment(s) again, the mobile unit again responds with "MU Done" during its assigned time. The mobile unit will not terminate the session until it either receives the "NT Done" command, or its session timer times out. The network terminal will not terminate the session until either it sends the "NT Done" command or its session timer times out. When transmitting the MU Done message, the mobile unit waits a predetermined amount of time for a NT Done message from the network terminal. If the message is not received within the time limit, then the mobile unit unilaterally closes the ARQ session successfully.

If the MU Done message is not received by the network terminal, the network terminal will transmit the last fragment using the same timing requirements as for earlier fragments. If the maximum time limit without a mobile unit response is exceeded, then the network terminal unilaterally aborts the ARQ session.

Reverse Channel ARQ

The ARQ method of the present invention for the reverse channel is the same as for the forward channel, with differences in the commands used due to the asymmetry of the connection (in which the network terminal is in control of all traffic). In one embodiment, only one reverse channel ARQ session is allowed at a time. In alternate embodiments, multiple reverse channel ARQ sessions may be allowed to occur at the same time. This is through the use of different session numbers which are sent with each communication. The session numbers allow the mobile unit and the network terminal to identify communications that belong to a particular ARQ session.

Figure 3:
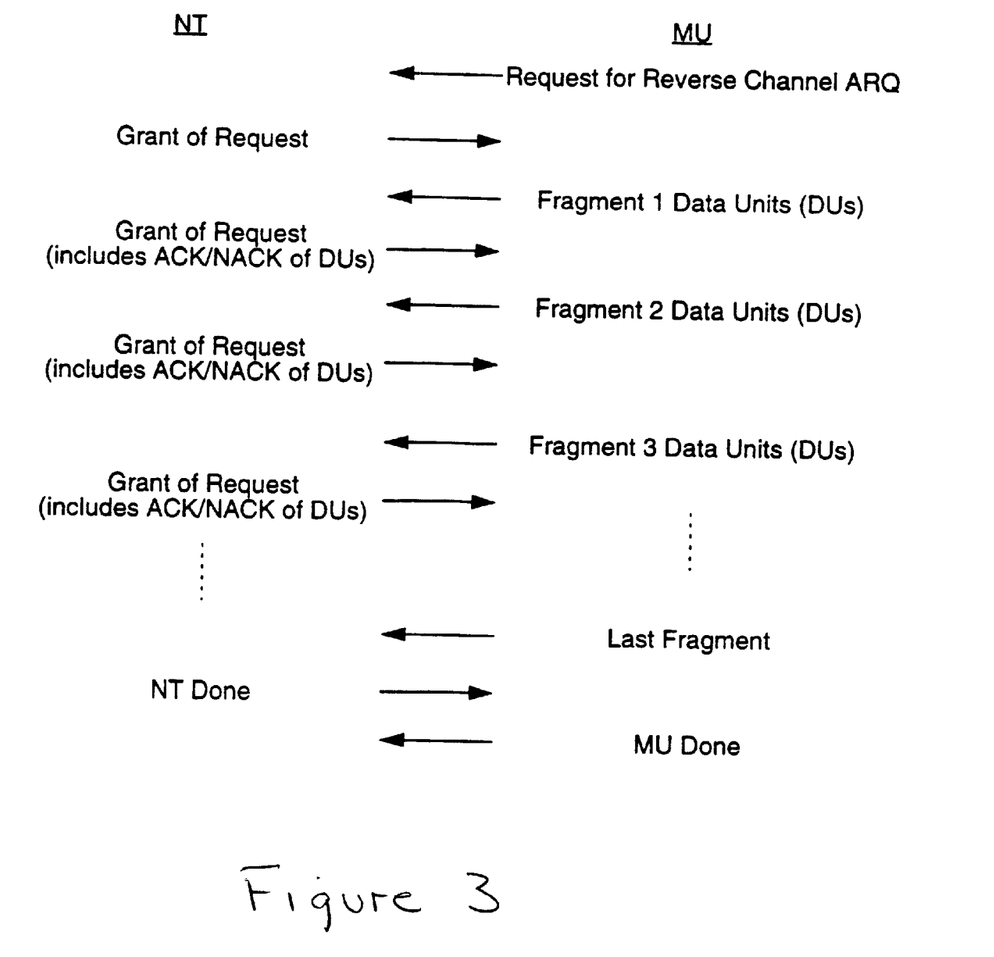
FIG. 3 illustrates a diagram of the messages for a reverse channel ARQ session.

FIG. 3 is a diagram of the messages for a reverse channel ARQ session. Referring to FIG. 3, a reverse channel ARQ session begins when the mobile unit sends a "Request for Reverse Channel ARQ" message to the network terminal. This request includes the length of the message in appropriate units (e.g., bytes or kilobytes) and a session number which identifies this session. In one embodiment, there is no scheduling information for the network terminal's reply, as the network terminal is itself in control of all scheduling. As in the case of the forward channel, all further transmissions between network terminal and mobile unit include the session number (until the session is terminated) to track the communications for each session back and forth between the mobile unit and the network terminal. This session number is chosen by the mobile unit from a set of numbers which are unused in both forward and reverse directions at the time of assignment.

When the network terminal receives this request from the mobile unit, the network terminal replies with either a "Grant of Request" or a denial.

The network terminal may decide to deny the ARQ session for a variety of reasons. In one embodiment, the network terminal may deny the ARQ session because the mobile unit may not be authorized to send messages of the desired size or because network traffic may be too high. The network terminal may also tell the mobile unit to defer the message until a later time. This may be accomplished by the network terminal transmitting scheduling information to the mobile unit which specifies the time in a future for the mobile unit to use the channel. Another method that the network terminal may defer is to reply to the mobile unit with an indication that it is processing a request and that the mobile unit should wait further. If the network terminal responds with a "Grant of ARQ Request", then this completes the initial handshake to start the ARQ session.

If the "Grant of ARQ Request" is not received within a predetermined time, the mobile unit transmits the Request. This process of resending the Request occurs up to a maximum (e.g., 3) number of times (retry values), after which the mobile unit aborts the ARQ session.

If the network terminal receives a Request after the Grant has been issued, then it transmits the Grant again. This situation could occur if the mobile unit misses the first Grant.

The Grant of Request from the network terminal includes scheduling information for the mobile unit indicating the number of fragments to transmit and at the time at which to transmit them. The mobile unit sends its fragments according to the scheduling information and awaits further Grants. Subsequent Grants from the network terminal include ACK and NACK information on the fragments sent in the previous Grant. The network terminal keeps track of which fragments have been received successfully, and the mobile unit keeps track of which fragments have been ACK'ed successfully by the network terminal. All retransmissions of fragments are scheduled by the network terminal. Thus, the network terminal controls the timing and bandwidth allocation of the reverse channel.

As with the Forward Channel ARQ, fragments are made up of a variable number of data units. The size of a data unit is fixed for the duration of a session to a single time-based unit. The fragment number range for new fragments is specified in the Grant as well. In one embodiment, the network terminal allocates enough air time in a single Grant for the mobile unit to resend all NACK'ed data units as well as the new data units within the specified air time. Therefore, a single mobile unit transmission can contain multiple data units transmitted consecutively within its scheduled air time. These data units are transmitted according to their consecutive order of occurrence within thee message.

Delays between Grant and the scheduled mobile unit transmission are kept as short as possible. In one embodiment, if reverse channel traffic requires a reduction in throughput for each mobile unit, the network terminal reduces the number of fragments and/or their size rather than increase the delay from Grant to mobile unit transmission. In fact, it is beneficial if the time to transmission is fixed to a single frame delay. This may maximize the number of retry attempts by the network terminal before a mobile unit timer expires if the forward channel link is faulty.

If the network terminal does not receive a data unit or units in response to a Grant, then the network terminal reissues a Grant for the outstanding data unit(s) by NACK'ing the outstanding fragment(s).

If the mobile unit has sent a data unit, and the network terminal Grants reverse channel air time for that data unit (this is not a NACK, but a first request for the data unit), then the mobile unit sends it again.

If the mobile unit does not receive ACK/NACK information for its transmission within a predetermined time, the mobile unit unilaterally aborts the session.

Because the network terminal schedules all fragments, it is aware when the entire message has been received. When this occurs, the network terminal sends a "NT Done" command to the mobile unit, signifying that the network terminal has received the entire message.

The network terminal Done command includes scheduling information for a response. When the mobile unit receives the network terminal Done message, it responds according to the scheduling information with an ACK. This terminates the ARQ session. In other words, the ACK/NACK flags in the response to the network terminal Done command are used by the mobile unit to terminate the session.

If the mobile unit misses the "NT Done" command, then the mobile unit awaits further grants for the last fragment. The network terminal timer awaiting the MU's ACK then expires, and the network terminal sends the "NT Done" command again. The mobile unit does not terminate the session until it receives the "NT Done" command or its session timer expires. The network terminal will not terminate the session until it receives positive acknowledgment (ACK) of its "NT Done" command or its session timer expires.

By using the present invention, the entire ARQ message may be received by the receiver with no errors in the message while using a reduced number of extraneous transmissions, thereby saving power consumption by the pager and prolonging battery life.

Exemplary Paging System

The present invention may be implemented for use with pagers in a one-way or two-way paging system. In other words, the communication device of the present invention may be designed for use in a one-way paging system or in a two-way paging system. In a one-way paging system, a computer, server, or other control device, comprising the network terminal described above, is interfaced to a transmitter in the paging system and initiates transmission of paging messages. The transmitter, via links to a satellite and one or more base transceivers, sends these paging messages to pagers.

Figure 4:
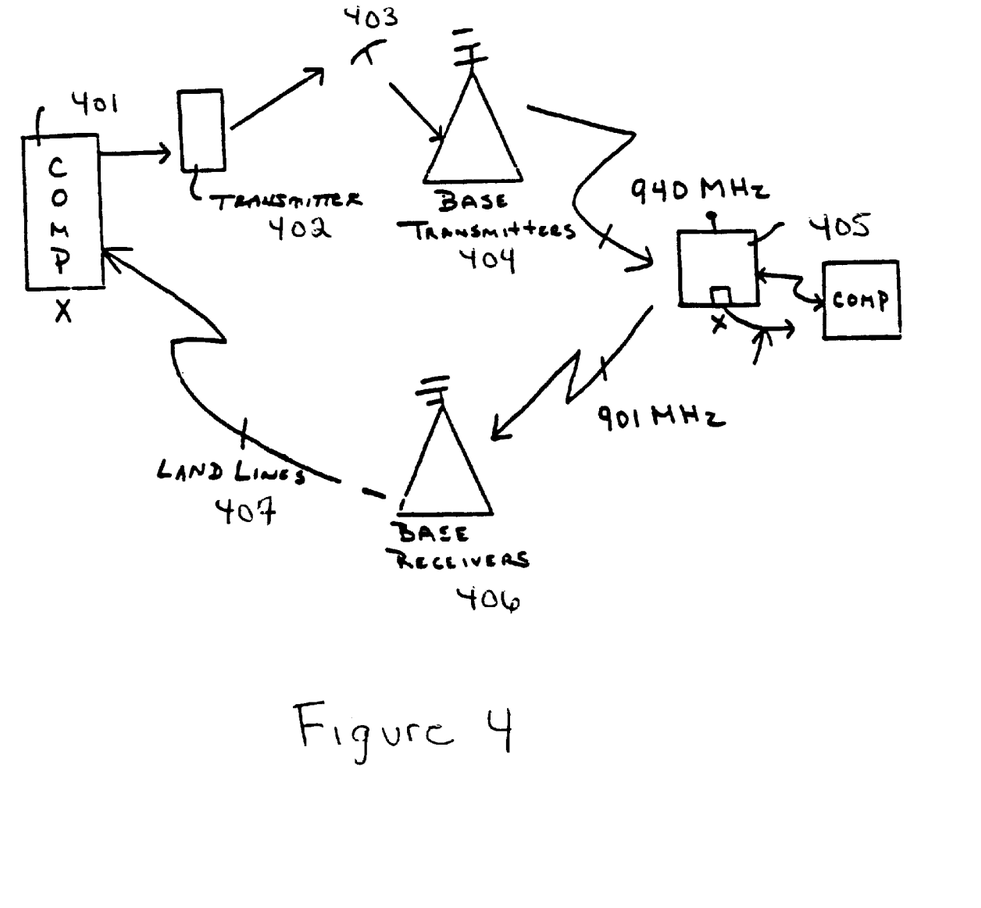
FIG. 4 illustrates a two-way paging system.

In a two-way paging system, such as is shown in FIG. 4, these same components comprise the same communication path to the pager. Referring to FIG. 4, a computer or other control device 401, operating as the network terminal described above, interfaces with a paging transmitter 402 (via, for instance, the Internet or some other network), transmitter 402 sends paging messages using satellite 403, and in turn, satellite 403 transmits the paging messages to base transmitter 404 for forwarding onto pager 405. In one embodiment, the communication between base transmitter 404 and pager 405 occurs at 940 MHz. Pager 405 includes transmitter functionality that allows for transmitting messages over air waves at 901 MHz to base receiver 406. Such functionality is well-known in the art. Base receiver 406 uses land lines to transmit the messages to the control device 401.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, forward and reverse ARQ methods have been described.

We claim:

1. A wireless selective call transceiver comprising:
   a storage space; and
   a control circuit coupled to the storage space, the control circuit to refuse to receive a message when available space in the storage space is not large enough to store the complete message, wherein the message is refused by the control circuit causing the selective call transceiver to transmit an abort message to the source of the refused message.

2. The transceiver defined in claim 1 further comprising a transmitter to send a negative acknowledgment (NACK) to signal a network that is sending the message.

3. The transceiver defined in claim 1 wherein the control increases the available space in the storage space to enable receipt of the message.

4. The transceiver defined in claim 1 wherein the control increases the available space in the storage space by deleting one or more previously stored messages.

5. The transceiver defined in claim 1 wherein the control deletes the one or more previously stored messages based on a priority scheme.

6. The transceiver defined in claim 1 wherein the one or more previously stored messages are stored in a folder designated to have the control delete its contents.

7. The transceiver defined in claim 4 wherein the control maintains an indication specifying the one or more previously stored messages for deletion which the control uses in deciding to delete the one or more previously stored messages.

8. A method of performing wireless Automatic Repeat reQuest (ARQ) messaging between a sending unit and a receiving unit, said method comprising:
   sending a command to the receiving unit to start a channel ARQ session; and
   the receiving unit refusing to accept an ARQ message, by sending an abort message to the sending unit, if available space in a memory of the receiving unit is not large enough to store the entire ARQ message.

9. The method defined in claim 4 further comprising:
   the second unit determining an amount of storage required by the ARQ message from the message length field; and
   the second unit comparing the amount of storage required by the ARQ message to the available space in the memory.

10. The method defined in claim 4 wherein the ARQ message comprises a plurality of fragments and the message length field indicates the length of the plurality of fragments.

11. The method defined in claim 4 further comprising:
   the second unit responding with an acknowledgment if the second unit desires the first unit to send the ARQ message or a memory full response if the available space in the memory is not sufficient to store the ARQ message.

12. The method defined in claim 7 further comprising terminating the ARQ session in response to the memory full response.

13. The method defined in claim 7 further comprising the second unit responding with a request for the first unit to resend the command.

14. The method defined in claim 9 further comprising:
the first unit resending the command within a predetermined time limit in response to receiving the request for the first unit to resend the command, or
the second unit unilaterally terminating the ARQ session if the first unit does not resend the command within the predetermined time limit.

15. The method defined in claim 4 further comprising:
the second unit acknowledging each received fragment of the ARQ message; and
the first unit sending a fragment of the ARQ message within a predetermined time limit in response to each acknowledgment by the second unit.

16. The method defined in claim 11 further comprising:
the second unit unilaterally terminating the ARQ session if the predetermined time limit is exceeded.

17. The method defined in claim 4 further comprising:
the first unit sending the ARQ message;
the second unit sending a first done indication message to the first unit after receiving all fragments of the ARQ message; and
the first unit sending a second done indication message to the second unit in response to the first done indication message to complete transfer of the ARQ message.

18. The method defined in claim 13 further comprising:
the first unit retransmitting at least a last fragment of the ARQ message if the first done indication message is not received.

19. A wireless communication system comprising:
a sending unit to send a command to start an Automatic Repeat reQuest (ARQ) session; and
a receiving unit to accept or reject the command based on whether available storage space in the receiving unit is large enough to store a complete associated ARQ message, wherein the command is rejected by the receiving unit sending an abort message command to the sending unit.

20. The system defined in claim 15 wherein the second unit responds with an acknowledgment if the second unit desires the first unit to send the ARQ message or responds with a memory fill response if the available storage in the second unit is not sufficient to store the ARQ message.

21. The system defined in claim 15 wherein the second unit responds with a request for the first unit to resend the command.

22. The system defined in claim 17 wherein the first unit resends the command within a predetermined time limit in response to receiving the request for the first unit to resend the command, or the second unit unilaterally terminates the ARQ session if the first unit does not resend the command within the predetermined time limit.

23. The system defined in claim 17 wherein the second unit acknowledges each received fragment of the ARQ message, and the first unit sends a fragment of the ARQ message within a predetermined time limit in response to each acknowledgment by the second unit.

24. The system defined in claim 19 wherein the second unit unilaterally terminates the ARQ session if the predetermined time limit is exceeded.

25. The system defined in claim 17 wherein the first unit sends the ARQ message after receiving a reply from the second unit, and wherein the second unit sends a first done indication message to the first unit after receiving all fragments of the ARQ message, in response to which the first unit sends a second done indication message to the second unit to complete the ARQ session.

26. The system defined in claim 15 wherein the first unit retransmits at least a last fragment of the ARQ message if the first done indication message is not received.

27. A method of performing a Reverse Channel Automatic Repeat reQuest (ARQ) between a mobile pager unit and a base unit, said method comprising:
the mobile pager unit sending an ARQ message as part of a Reverse Channel ARQ session;
the base unit sending a done indication signal to the mobile pager unit after receiving all of the ARQ message;
the mobile pager unit sending an acknowledgment indication to the base unit in response to receiving the done indication message to terminate the ARQ session.

28. The method defined in claim 23 further comprising:
the first unit terminating the ARQ session if the done indication message has not been received after a first predetermined time limit; and
the second unit resending the done indication message if the acknowledgment indication is not received within a second predetermined time limit.

29. The method defined in claim 24 further comprising the second unit terminating the ARQ session if the acknowledgment indication has not been received within a third predetermined time limit.

30. The method defined in claim 23 wherein the request comprises a message length field specifying the length of an ARQ message to be sent by the first unit to the second unit.

31. The method defined in claim 23 further comprising:
sending a request to the second unit to start a reverse channel ARQ session; and
the second unit granting the request.

* * * * *

UNITED STATES PATENT AND TRADEMARK OFFICE
CERTIFICATE OF CORRECTION

PATENT NO. : 6,557,134 B2  Page 1 of 1
DATED : April 29, 2003
INVENTOR(S) : H. Bims et al.

It is certified that error appears in the above-identified patent and that said Letters Patent is hereby corrected as shown below:

Column 10,
Line 32, "claim 1" should read -- claim 3 --
Lines 35 and 38, "claim 1" should read -- claim 4 --
Lines 54, 62 and 65, "claim 4" should read -- claim 8 --

Column 11,
Lines 4 and 7, "claim 7" should read -- claim 11 --
Line 10, "claim 9" should read -- claim 13 --
Lines 17 and 27, "claim 4" should read -- claim 8 --
Line 24, "claim 11" should read -- claim 15 --
Line 36, "claim 13" should read -- claim 17 --
Lines 49 and 54, "claim 15" should read -- claim 19 --
Line 52, "fill response" should read -- full response --

Column 12,
Lines 1, 7 and 15, "claim 17" should read -- claim 21 --
Line 12, "claim 19" should read -- claim 23 --
Line 22, "claim 15" should read -- claim 19 --
Lines 37, 48 and 51, "claim 23" should read -- claim 27 --
Line 44, "claim 24" should read -- claim 28 --

Signed and Sealed this

Twenty-eighth Day of October, 2003

JAMES E. ROGAN
*Director of the United States Patent and Trademark Office*